| United States Patent [19] | [11] Patent Number: 4,738,810 |
|---|---|
| Cheng-Shiang | [45] Date of Patent: Apr. 19, 1988 |

[54] FOAMS OF LINEAR LOW DENSITY POLYETHYLENE AND A METHOD FOR THEIR PREPARATION

[75] Inventor: John S. Cheng-Shiang, Madrid, Spain

[73] Assignee: The Dow Chemical Company, Midland, Mich.

[21] Appl. No.: 756,905

[22] Filed: Jul. 19, 1985

[51] Int. Cl.$^4$ .......................... C08J 9/10; B29C 67/22
[52] U.S. Cl. ...................................... 264/54; 264/141; 264/DIG. 18; 521/79; 521/81; 521/143; 521/144; 521/134; 521/94
[58] Field of Search .................. 521/79, 81, 143, 134; 264/54, DIG. 18, 141

[56] References Cited

U.S. PATENT DOCUMENTS

| 3,608,006 | 9/1971 | Hosoda et al. | 264/DIG. 18 |
|---|---|---|---|
| 3,651,183 | 3/1972 | Hosoda et al. | 264/DIG. 18 |
| 3,812,225 | 5/1974 | Hosoda et al. | 264/DIG. 18 |
| 4,048,275 | 9/1977 | Usamoto et al. | 264/DIG. 18 |
| 4,163,085 | 7/1979 | Kühnel et al. | 264/DIG. 18 |
| 4,166,890 | 9/1979 | Fried et al. | 264/DIG. 18 |
| 4,255,371 | 3/1981 | Shimoyashiki et al. | 264/DIG. 18 |
| 4,338,271 | 7/1982 | Kumasaka et al. | 264/DIG. 18 |
| 4,409,164 | 10/1983 | Brasz et al. | 264/DIG. 18 |
| 4,424,181 | 1/1984 | Senuma et al. | 264/DIG. 18 |
| 4,519,963 | 5/1985 | Yoshida et al. | 264/DIG. 18 |
| 4,552,708 | 11/1985 | Kimura et al. | 264/DIG. 18 |

FOREIGN PATENT DOCUMENTS 53929 3/1983 Japan .
135236 3/1984 Japan .

*Primary Examiner*—Morton Foelak

[57] ABSTRACT

Foams are prepared from a linear low density polyethylene and, optionally, other olefinic polymers, such as a low density polyethylene using a chemical cross-linking agent. The resulting cross-linked polyethylene foams exhibit an excellent balance of properties at generally lower densities than foams prepared from low density polyethylene only.

9 Claims, No Drawings

FOAMS OF LINEAR LOW DENSITY POLYETHYLENE AND A METHOD FOR THEIR PREPARATION

BACKGROUND OF THE INVENTION

This invention relates to foams prepared from a linear low density polyethylene and to a method for preparing said foams.

Heretofore, foams have been prepared from a variety of polymeric materials. One polymeric material which has been used extensively in preparing foams is low density polyethylene.

There are two methods for the preparation of a foam from a low density polyethylene in common use. One of these conventional methods comprises preparing the polyethylene foam by blending the low density polyethylene, in molten condition, with a blowing agent and forming a sheet from the resulting blend. Thereafter, the sheet is irradiated with ionizing radiation to cross-link the polyethylene and foamed by the gases given off by the decomposition of the blowing agent.

In the second conventional method for preparing foams from low density polyethylene, as described in U.S. Pat. No. 3,098,831, the low density polyethylene is mixed with a cross-linking agent such as an organic peroxide, a blowing agent, and, optionally, other additives. This mixture is subsequently prepared as a sheet material without significant expansion. The sheet material is then heated to a temperature such that the organic peroxide decomposes, thereby cross-linking the polyethylene. Simultaneously or subsequent to the cross-linking reaction, gases generated by the decomposition of the blowing agent expand the sheet to form the desired low density foam.

In general, foams having a fine cell ("microcell") structure are commercially prepared, in a continuous manner, using irradiation cross-linking whereas foams having a normal cell structure can be prepared using either irradiation cross-linking or a chemical cross-linking agent.

Although the foams prepared from low density polyethylenes possess many desirable physical and chemical properties such as flexibility, tenacity, elasticity, heat insulative value and excellent electrical properties; it remains desirable to prepare foams of equivalent or better physical properties at lower foam densities or better physical properties at equivalent densitites.

Therefore, it still remains desirable to prepare foams of superior properties at the same density using a chemical cross-linking agent or equivalent properties at lower densitites. This would increase the effectiveness of the foaming operation by increasing its productivity and/or by reducing the amounts of polymeric material required for preparing a foam of desired properties.

Accordingly, the present invention is a method for preparing a foam of one or more cross-linked olefinic polymer(s) and, optionally, one or more other polymer(s) wherein the olefinic polymer or, if two or more olefinic polymers are employed, at least one of the olefinic polymers is a linear low density polyethylene. The method comprises mixing the linear low density polyethylene, blowing agent and other additives, if employed, preparing the resulting mixture as a sheet material and subsequently cross-linking and foaming the resulting sheet material. The method is characterized in that the linear low density polyethylene has a Vicat softening temperature, as measured by ASTM test method designated D-1525-75 of less than 105° C., the cross-linking is affected by a chemical cross-linking agent and the cross-linking agent is employed in an amount of 0.3 to 1.5 weight percent and the blowing agent is employed in an amount of from 0.1 to 30 weight percent, said weight percents being based on the total weight of the polymeric material employed. In a particularly preferred method, the foam is prepared from a combination of a linear low density polyethylene and a low density polyethylene.

It has been found that a foam can effectively be prepared, using the specific amounts of a blowing agent and chemical cross-linking agent, from a linear low density polyethylene having the specified Vicat softening temperature. Surprisingly, it has been unexpectedly found that using a chemical cross-linking initiator, foams of a normal cell size can be prepared having equivalent physical properties at lower densitites using the linear low density polyethylene or a combination of a linear low density polyethylene and a low density polyethylene than an equivalent foam prepared from low density polyethylene alone. Specifically, a foam can be prepared from a blend of a low density polyethylene and a linear low density polyethylene having a density of at least 5, often at least 10 percent less than a foam prepared from a low density polyethylene while retaining equivalent or better tensile and tear strengths. In this manner, the effectiveness of the foaming operation is improved by increasing its productivity and/or by reducing the amounts of polymeric materials required for preparing a foam of desired properties.

In a preferred embodiment, the method comprises premixing at least a portion of the low density polyethylene, blowing agent, cross-linking agent and other components, if any. This premixture is subsequently mixed, advantageously without heating, with the linear low density polyethylene which has optionally been dry-blended with the remaining portion of low density polyethylene. The resulting mixture is then extruded to form the sheet material and subsequently cross-linked and foamed. By this method, any tendency of the linear low density polyethylene to cross-link during blending and sheet forming operation is advantageously reduced.

The foams of the present invention are suitable for use in a wide variety of applications including building materials, packing materials, floating materials and agricultural materials.

The cross-linked, olefinic polymer foams of the present invention are prepared from a linear low density polyethylene. The term "linear low density polyethylene" is well-known to those skilled in the art and is used conventionally herein. Illustrative of linear low density polyethylenes and techniques for their preparation are disclosed in U.S. Pat. Nos. 2,825,721; 2,993,876; 3,250,825 and 4,204,050 and European patent application No. 0 004 966. In general, linear low density polyethylenes are the copolymerization product of ethylene with one or more α-olefin having 3 or more carbon atoms such as 1-butene, 1-hexene or 1-octene. In general, the linear low density polyethylene will comprise from 85 to 99, preferably from 93 to 97, mole percent of polymerized ethylene and from 15 to 1, preferably from 7 to 3, mole percent of one or more α-olefin.

Of the various linear low density polyethylenes, those employed in the present invention exhibit a Vicat softening temperature of less than 105° C. This relatively low Vicat softening temperature is required since the softening temperature of the linear low density polyethylene influences the ability to blend the linear low density polyethylene with the blowing agent, cross-linking agent and, if employed, other polymeric components, and additives without substantially cross-linking the linear low density polyethylene during the blending operation. In general, as the softening temperature of the linear low density polyethylene is reduced, the ability to blend and/or form a sheet material without causing significant amounts of the linear low density polyethylene to crosslink is improved. Preferably, the linear low density polyethylene employed in the practice of the present invention will exhibit a Vicat softening temperature of less than 100° C., more preferably from 90° C. to 98° C. For the purposes of this invention, the Vicat softening temperature is determined by ASTM test method designated D 1525-5. Provided the linear low density polyethylene has the desired Vicat softening temperature, the specific low density polyethylene employed is dependent on the other properties of the polyethylene material, with linear low density polyethylenes having a melt index of from 0.2 to 10 g/10 min (g/10 m), more preferably from 1 to 7, most preferably from 2 to 5 g/10 m.

Although the foam products of the present invention can be prepared using a linear low density polyethylene as a sole polymeric component, it is generally advantageous to employ the linear low density polyethylene in combination with one or more other polymeric materials, e.g., one or more polyolefins including low density polyethylene, high density polyethylene, ethylene-vinyl acetate copolymers and derivatives thereof, copolymers of ethylene and acrylic acids or acrylic esters and derivatives thereof, olefinic ionomers.

The foam material is preferably prepared from a linear low density polyethylene and a low density polyethylene. The term "low density polyethylene" is used conventionally herein and refers to homopolymers of ethylene having a density from 0.91 to 0.94 grams per cubic centimeter (g/cm$^3$) at 20° C. Low density polyethylenes are illustrated by U.S. Pat. Nos. 3,756,996 and 3,628,918. The preferred low density polyethylenes advantageously employed in the practice of the present invention are dependent on a variety of factors including the specific linear low density polyethylene employed and the desired properties of the resulting foam. In general, the preferred low density polyethylenes employed in preparing the foams have a melt index of 0.2 to 10, more preferably from 2 to 6, most preferably from 3 to 4, g/10 min.

In preparing the foam, the amounts of the linear low density polyethylene and the low density polyethylene most advantageously employed will vary depending on the properties of the specific linear low density and low density polyethylenes employed and on the desired physical and chemical properties of the resulting foam. In general, the foam will advantageously comprise from 1 to 70, preferably from 5 to 50, weight percent of the linear low density polyethylene and from 30 to 99, preferably from 50 to 95, weight percent of the low density polyethylene said weight percents being based on the total weight of the linear low density and low density polyethylenes, in the foam. Most preferably, the foam is prepared from a blend of 10 to 30 weight percent of the linear low density polyethylene and from 70 to 90 weight percent of the low density polyethylene.

In addition, minor amounts of other polymeric materials such as rubbers including natural rubbers and ethylene-propylene rubbers and plastics can also be employed in combination with the linear low density polyethylene. If employed, these polymeric materials will generally be employed in amounts less than 10, more generally less than 15, weight percent based on the total weight of the polymeric components employed in preparing the foamed material.

The blowing agents employed in preparing the cross-linked olefin polymer foams of the present invention include those materials which decompose or vaporize, preferably decompose, at a higher temperature than the softening temperature of the polymeric components and the half-life temperature of the cross-linking agent, if employed and which when decomposed generate a gas which foams the polymeric material. In general, the blowing agent will have a decomposition temperature (with the liberation of gaseous material) from 130° C. to 350° C. and which is preferably at least 20° C. above the softening point of the polymeric components. Representative examples of these materials include dinitrosopentamethylenetetramine, azodicarbonamide, sodium bicarbonate, p,p'-oxy-bisbenzene-sulfonylhydrazide and p-toluene-sulfonyl-semicarbazide. Preferred as the blowing agent is azodicarbonamide.

The cross-linking of the linear low density polyethylene and any other olefinic polymeric components employed in preparing the foam is achieved, in the present invention, using a chemical cross-linking agent. Representative cross-linking agents which are usefully employed herein are the organic peroxides, azido compounds and p-quinone dioximes. Since the activity of the chemical cross-linking agent will affect the ability to prepare a sheet without significantly cross-linking the linear low density polyethylene, the cross-linking agent is selected accordingly. Advantageously, the chemical cross-linking agent will exhibit a half life temperature, at a half-life of 10 hours, of some temperature from 90° C. to 130° C., preferably from 95° C. to 125° C. In general, the organic peroxides, particularly alkyl and aralkyl peroxides are preferred. Representative of such organic peroxides are dicumylperoxide, 2,5-dimethyl-2,5-di(tertbutylperoxy)hexane, tertiary butyl-perbenzoate, tertiary butylperterephthalate, and tertiary butyl peroxide. Most preferably, the cross-linking agent is dicumyl peroxide.

The amounts of the blowing agent and, the cross-linking agent employed in preparing the foams of the present invention are dependent on a variety of factors. In general, the amount of blowing agent employed is primarily dependent on the desired density of the foam. The density of the foam will generally vary between 10 and 100 kilograms per cubic meter (kg/m$^3$), with the density preferably being from 12 to 50, more preferably from 15 to 40, kg/m$^3$. The amount of cross-linking agent most advantageously employed is dependent on the specific blowing agent and the cross-linking agent employed, the type and amount of polymeric materials employed in preparing the foam and the desired properties, particularly the cross-linking degree, of the resulting foam products. The cross-linking degree of the foam, as measured by techniques of ASTM test method designated D-2765-68 is advantageously at least 60, preferably from 60 to 80, more preferably from 65 to 75 percent.

In the practice of the present invention, it is generally desirable to use greater amounts of the blowing agent and lower amounts of the cross-linking agent than when preparing a foam from low density polyethylene alone.

In general, to prepare a foam having the required properties at a desired density, the blowing agent is employed in an amount from 0.1 to 30 and the cross-linking agent in an amount from 0.3 to 1.5 weight parts per 100 weight parts of the polymeric material employed in preparing the foam. Preferably, the blowing agent is employed in an amount from 1 to 26, more preferably from 2.5 to 23 parts, by weight, per 100 parts of the polymeric material. The cross-linking agent is preferably employed in an amount from 0.5 to 1.3, more preferably in an amount from 0.6 to 1.2 parts, by weight, per 100 parts of the polymeric material.

The foams of the present invention can also contain additives such as antioxidants, pigments, flame retarding agents, antistatics and lubricants. Additives conventionally employed and their effects are well-known in the art and reference is made thereto for the purposes of this invention.

In preparing the foam, the linear low density polyethylene is mixed with the blowing agent and the cross-linking agent, other polymeric components, and additives. The resulting mixture is subsequently foamed. If no other polymeric components are employed, to prevent significant cross-linking of the linear low density polyethylene while mixing the linear low density polyethylene with the blowing agent and cross-linking agent, the linear low density polyethylene is preferably ground to a powder and the powder subsequently mixed, without significant heating, with the cross-linking and blowing agents. The resulting mixture is then prepared as a foam.

Alternatively, in preparing a foam from a linear low density and low density polyethylene, the linear low density and low density polyethylenes are mixed with the blowing agent and the cross-linking agent, other polymeric components and additives and the resulting mixture is subsequently foamed. In one method for preparing the foaming composition, the linear low density polyethylene and low density polyethylene are blended. The resulting blend is then extruded to form a sheet material. Subsequently, the sheet material is granulated and then combined with the blowing agent and cross-linking agent and other additives, for subsequent formation into sheet and/or foam. Although such method can be employed if conditions are properly controlled and monitored throughout, it as been found the linear low density polyethylene tends to cross-link excessively during the described operation, thereby resulting in foams of reduced uniformity.

In yet another method for preparing the desired foaming composition, the linear low density polyethylene can be melt blended with the other polymeric material. However, due to the temperatures required for the melt blending operation, the shearing and heat generation can cause significant cross-linking of the linear low density polyethylene. This often results in a foam having holidays, large void spaces and other defects.

To reduce the problems associated with using a linear low density polyethylene in preparing a foam, it has now been found that it is preferred to pre-mix the low density polyethylene or other polymeric component, the blowing agent and, the cross-linking agent and other additives at conditions sufficient to form a homogeneous mixture of these components and subsequently blend the resulting pre-mixture with the linear low density polyethylene. The pre-mixing operation preferably comprises dry blending the low density polyethylene or other polymeric material with the other individual components and thereafter homogenizing the blend such as by extruding the dry blend at a temperature above the temperature at which the polymeric component is softened. For example, when employing a low density polyethylene, only, this extrusion operation is advantageously conducted at temperatures from 80° to 125° C. If another polymer material is employed in combination with the low density polyethylene, the conditions of extrusion are modified accordingly. In general, the extrusion step is sufficient to form a composition of desired homogeneity. If required, increased homogeneity can be obtained by treatment in a Banbury mixer, a roll mill, a calender or the like prior to extrusion. The thus extruded pre-mix can advantageously be ground into granular form for subsequent blending with a linear low density polyethylene.

Prior to blending with the pre-mixture, the linear low density polyethylene can and, often advantageously is, dry blended with additional amounts of the low density polyethylene and, it employed, the other polymeric material(s). In particular, it is often advantageous to use only a portion of the low density polyethylene or other polymeric material in the preparation of the pre-mixture and to dry blend the remaining portion of the low density polyethylene or other polymeric material with the linear low density polyethylene. The resulting dry blended mixture of the polymeric components is then blended with the premixture containing the cross-linking and blowing agents to form a composition for subsequent foaming.

In foam preparation, the foaming composition is advantageously extruded initially as a sheet material. To prepare a foam of optimum uniformity, the sheet forming step is preferably conducted at conditions such that the linear low density is not significantly cross-linked. Such conditions are dependent on a variety of factors, primarily the specific polymeric materials and cross-linking agent employed and the time and temperature required for sheet formation. In general, the extrusion is conducted at temperatures between 90° and 145° C., preferably at a temperature from 100° to 125° C. Exposure of the foaming composition to the extrusion temperature is preferably less than 10 minutes, more preferably for 2 to 8 minutes. The sheet is advantageously prepared at a thickness of from 1 to 4 mm, preferably from 1.5 to 3.5 mm.

Following sheet formation from the desired foaming composition, the sheet is foamed at conditions sufficient to form a foam of desired density and other physical properties. In general, the foaming operation is conducted by subjecting the sheet material to an elevated temperature sufficient to cross-link the polyolefinic components and to expand the foaming composition. Although the temperatures to which the sheet material is exposed are dependent on the desired expansion and the heating period, in general, the foaming/ cross-linking operation is conducted at temperatures between 150° and 275° C., advantageously between 150° and 260° C.

A preferred method for preparing the foam from the sheet material when using a chemical cross-linking agent comprises subjecting the sheet material to a first temperature and thereafter subjecting the sheet material to a second and generally higher temperature. Preferably, at the first temperature, the polyethylene is primarily cross-linked to some significant conversion. This cross-linking is preferably conducted at temperatures from 150° to 250° C. Subsequently, the sheet material is subjected to a temperature at which the blowing agent decomposes and the actual foaming occurs. This temperature is generally higher than the initial temperature to which the sheet is exposed with a temperature from 210° to 260° C. being preferred.

Subsequent to the foaming operation, the now foamed sheet is cooled. If desired, the surfaces of the sheet can then be smoothed and/or the thickness of the sheet made uniform. In general, the foam is advantageously prepared at a thickness of from 5 to 20 mm, preferably from 5 to 15 mm. The foam sheet can be subjected to any desired secondary process in the course of cooling such as embossing by means of an embossing roll, lamination with plastic sheet or cloth by heating or adhesive, two direction drawing, vacuum molding or compression molding. Moreover, elongated foam strings can be manufactured continuously by passing the foam sheet between two rolls each provided with semi-circulate grooves on the surface.

The following examples are set forth to illustrate the advantages of the olefinic foams of the present invention and methods for their preparation. The examples should not be construed to limit the scope of the invention. In the Examples, all parts and percentages are by weight unless otherwise indicated.

For the purposes of the present invention and the following Examples, the density is measured by ASTM test method D-1564-71-W, the tensile is measured by the techniques of ASTM test method designated D-1564-71-T, the tear resistance was measured by the techniques of ASTM test method designated D-624-73, the compression was measured by the methods described in ASTM D-1564-71-D; the elasticity was measured using the techniques described in ASTM D-1564-71-R and the cross-linking degree was determined by the techniques of ASTM D-2765-68.

EXAMPLE 1

A foam was prepared from a mixture of a low density polyethylene and linear low density polyethylene using the following technique. A pre-mixture was prepared by dry blending 40 parts of a powder of a low density polyethylene having a melt index of 3.5 g/10 min., a density of 0.918 g/cm³ and a Vicat softening temperature of 96° C. with 26 parts of azodicarbonamide blowing agent and 0.7 parts of dicumyl peroxide cross-linking agent.

A mixture of a low density polyethylene and a linear low density polyethylene was prepared by blending 50 parts of the low density polyethylene identical to that employed in preparing the premixture except in granular form and 10 parts, in granular form, of a linear low density polyethylene having a melt index of 2.3 g/10 min, a density of 0.917 g/cm³ and a Vicat softening temperature of 96° C. The dry blend was then extruded at temperatures from 90° to 115° C. to form a sheet. The sheet was then granulated and the granules of the low density/linear low density polyethylene dry blended with the premixture. The resulting mixture which comprised 90 parts of the low density polyethylene, 10 parts of the linear low density polyethylene, 26 parts of the blowing agent and 0.7 parts of the cross-linking agent was then extruded at temperatures from 100° (feed zone) to 125° C. (die temperature) to form a sheet material. Subsequently, the sheet was subjected to a temperature of 210° C. which is sufficient to cross-link the polyethylene and to expand the sheet.

EXAMPLE 2

Using materials and techniques identical to those of Example 1, a foam of a linear low density polyethylene and low density polyethylene was prepared except that the dry blend of the low density and linear low density polyethylenes comprised 40 parts of the low density polyethylene and 20 parts of the linear low density polyethylene.

COMPARATIVE EXAMPLE A

A foaming composition was prepared from a pre-mixture of 40 parts of a low density polyethylene identical to that employed in Examples 1 and 2, 22.3 parts of azodicarbonamide and 0.7 parts of dicumyl peroxide. This was then dry blended with 60 additional parts of the low density polyethylene. A sheet material was prepared and subsequently foamed in an identical manner to that of Examples 1 and 2.

The density, tensile properties, tear resistance, compression strength, elasticity and cross-linking degree of the foams prepared in Example Nos. 1 and 2 and Comparative Example A were measured. The results of this testing are set forth in accompanying Table I.

TABLE I

| | Example No. 1 (LDPE/LLDPE) | Example No. 2 (LDPE/LLDPE) | Comparative Example A (LDPE) |
|---|---|---|---|
| Foaming Composition[1] | | | |
| Pre-Mixture | | | |
| LDPE | 40 | 40 | 40 |
| AZO | 26 | 26 | 22.3 |
| DCP | 0.7 | 0.7 | 0.7 |
| PE Dry Blend | | | |
| LDPE | 50 | 40 | 60 |
| LLDPE | 10 | 20 | — |
| Foam Property | | | |
| Density, g/dm³ | 18 | 18 | 25 |
| Tensile Strength kg/cm³ | 2.1 | 2.4 | 1.7 |
| Elongation, % | 125 | 137 | 79 |
| Tear Strength, kg/cm | 1.21 | 1.45 | 1.2 |
| Compression, kg/cm² | 0.28 | 0.38 | 0.32 |
| Elasticity, % | 45 | 45 | 36.6 |
| Cross-Linking Degree, % | 78 | 78 | 72 |

[1]The components of the foaming composition are set forth in abbreviated form, with
LDPE = low density polyethylene
LLDPE = linear low density polyethylene
AZO = azodicarbonamide
DCP = dicumyl peroxide As evidenced by the results of the testing set forth in Table I, the foams prepared from a composition containing both low density and linear low density polyethylenes exhibit equivalent or better tensile properties, tear resistance, compression strength and elasticity at significantly lower densities than the foam prepared from low density polyethylene only. Due to some cross-linking of the linear low density polyethylene during formation of the sheet material, the resulting foam prepared from the linear low density polyethylene was found to periodically contain defects such as holes or void areas.

EXAMPLE 3

A low density/linear low density polyethylene foam was prepared using the following techniques. A pre-mixture was prepared by mixing 30 parts of the low density polyethylene identical to that employed in Example 1 with 16 parts of the azodicarbonamide and 0.5 parts of a dicumyl peroxide. This mixture was subsequently extruded as a sheet at temperatures from 90° (feed zone) to 115° C. (die temperature) and subsequently ground into a form of granules of 3 to 4 millimeters length. The granulated pre-mixture was subsequently dry blended with an additional 50 parts of the low density polyethylene and 20 parts of the linear low density polyethylene identical to that employed in Example 1. The resulting dry blend was then extruded into sheet form at temperatures from 100° to 125° C. and an extrusion time of 3.5 minutes. The resulting sheet material was subsequently foamed using the techniques set forth in Example 1.

EXAMPLES 4-6

Low density/linear low density polyethylene foams were prepared using identical techniques to that of Example 3 except that the amounts of dicumyl peroxide are varied as set forth in Table II.

COMPARATIVE EXAMPLE B

A foam is prepared using the techniques of Example 3 except that 70 parts of the low density polyethylene are employed in place of the dry blend comprising 50 parts of the low density polyethylene and 20 parts of the linear low density polyethylene.

The density, tear resistance, tensil properties, compression strength of the foams prepared in Examples 3-6 and Comparative Example B were measured and are set forth in the accompanying Table II.

TABLE II

| Example No. | 3 | 4 | 5 | 6 | Comparative Example B |
|---|---|---|---|---|---|
| Foaming Composition[1] | | | | | |
| Pre-Mixture | | | | | |
| LDPE | 30 | 30 | 30 | 30 | 30 |
| AZO | 16 | 16 | 16 | 16 | 16 |
| DCP | 0.5 | 0.6 | 0.7 | 0.85 | 0.73 |
| PE Dry Blend | | | | | |
| LDPE | 50 | 50 | 50 | 50 | 70 |
| LLDPE | 20 | 20 | 20 | 20 | — |
| Foam Property | | | | | |
| Density, g/dm$^3$ | 25 | 26 | 26 | 31 | 33 |
| Tensile Strength, kg/cm$^2$ | 3.6 | 3.4 | 3.8 | 5.4 | 2.6 |
| Elongation, % | 195 | 175 | 168 | 158 | 90 |
| Tear Strength, kg/cm | 3.0 | 2.65 | 3.3 | 3.5 | 2.0 |
| Compression Strength, kg/cm$^2$ | 0.43 | 0.40 | 0.415 | 0.43 | 0.44 |
| Cross-Linking Degree, % | 72 | 76 | 78 | 78 | 72 |

[1]Same as footnote[1] in Table I

As evidenced by the data in Table II, the cross-linking degree and physical properties of the low density/linear low density polyethylene foams are dependent on the amounts of dicumyl peroxide employed. In all cases, the low density/linear low density polyethylene foams exhibited equivalent or better properties and lower densities than a foam prepared from the low density polyethylene alone.

EXAMPLE 7

A low density/linear low density polyethylene foam was prepared in the manner set forth in Example 3 except that the pre-mixture comprised 33.33 parts of the low density polyethylene, 23 parts of the azodicarbonamide and 0.66 parts of the dicumyl peroxide. The low density/linear low density polyethylene blend which was subsequently mixed with the pre-mixture comprised 56.66 parts of the low density polyethylene and 10 parts of a linear low density polyethylene different than that employed in Example 3 and having a melt index of 6 g/10 min., a density of 0.918 g/cm$^3$ and a Vicat softening temperature of 97° C.

EXAMPLE 8-9

Foams were prepared in an identical manner to that of Example 7 except that the linear low density polyethylene and low density polyethylene were employed in the amounts set forth in Table III.

The densities, tensile properties, tear resistance, compression strength, and cross-linking degree of each of the foams prepared in Examples 7-9 were measured. These results are set forth in accompanying Table III as are the testing results of the foam prepared in Comparative Example A.

TABLE III

| EXAMPLE NO. | 7 | 8 | 9 | Comparative Example A |
|---|---|---|---|---|
| Foaming Composition[1] | | | | |
| Pre-Mixture | | | | |
| LDPE | 33.3 | 33.3 | 33.3 | 40 |
| AZO | 22.9 | 22.9 | 22.9 | 23 |
| DCP | 0.66 | 0.66 | 0.66 | 0.7 |
| PE Dry Blend | | | | |
| LDPE | 56.7 | 46.7 | 36.7 | 60 |
| LLDPE | 10 | 20 | 30 | — |
| Foam Property | | | | |
| Density, g/dm$^3$ | 20 | 22 | 22 | 25 |
| Tensile Strength kg/cm$^2$ | 2.8 | 2.25 | 2.35 | 1.65 |
| Elongation, % | 163 | 137 | 135 | 75 |
| Tear Strength, kg/cm | 1.85 | 2.15 | 2.3 | 1.2 |
| Compression Strength, kg/cm$^2$ | 0.36 | 0.35 | 0.35 | 0.32 |
| Cross-linking Degree, % | 66 | 68 | 66 | 72 |

[1]Same as Footnote[1] in Table I

As evidenced by the data set forth in Table III, as the amounts of the linear low density polyethylene increased in the low density/linear low density polyethylene foam, the resistance to tear also increased but the elongation of the foam decreased. Using the amount of dicumyl peroxide employed in Example 7 (0.66 parts per 100 parts of polyolefin), foams prepared from 40 parts or more of the linear low density polyethylene were found to exhibit inferior properties. This was believed due to the fact that the dicumyl peroxide level was too low to provide the necessary cross-linking of the linear low density and low density polyethylenes required to prepare a foam of desired properties. Increasing the amount of dicumyl peroxide to 0.73 parts per 100 parts of polyolefin resulted in the preparation of foams having desirable properties.

EXAMPLES 10-14

A series of low density polyethylene foams was prepared using the techniques of Example 7 and the amounts of the individual components as set forth in the accompanying Table IV. The linear low density polyethylene employed in these Examples was identical to that employed in Examples 7-9. The density, cross-linking degree, tensile properties, tear resistance and compression strength of the resulting foam products were measured. These properties as well as the properties of the foam of Comparative Example B are set forth in Table IV.

TABLE IV

| EXAMPLE NO. | 10 | 11 | 12 | 13 | 14 | Comparative Example B |
|---|---|---|---|---|---|---|
| Foaming Composition[1] | | | | | | |
| Pre-Mixture | | | | | | |
| LDPE | 30 | 30 | 30 | 30 | 30 | 30 |
| AZO | 15 | 15 | 15 | 15 | 15 | 16 |
| DCP | 0.8 | 0.8 | 0.8 | 0.8 | 0.8 | 0.73 |
| PE Dry Blend | | | | | | |
| LDPE | 60 | 50 | 40 | 30 | 20 | 70 |
| LLDPE | 10 | 20 | 30 | 40 | 50 | — |
| Foam Property | | | | | | |
| Density, g/dm$^3$ | 29 | 33 | 31 | 33 | 38 | 33 |
| Tensile Strength kg/cm$^2$ | 4.6 | 5.0 | 4.8 | 5.04 | 5.25 | 2.6 |
| Elongation, % | 178 | 200 | 171 | 198 | 250 | 90 |
| Tear Strength, kg/cm | 2.2 | 2.5 | 2.4 | 3.0 | 3.4 | 2.0 |
| Compression Strength kg/cm$^2$ | 0.46 | 0.43 | 0.42 | 0.40 | 0.42 | 0.44 |
| Cross-linking Degree, % | 72 | 69 | 72 | 71 | 68 | 72 |

[1]Same as Footnote[1] in Table III

The results reported in Table IV again evidence the unexpectedly superior properties exhibited by foams of low density polyethylene/linear low density polyethylene as compared to a foam of low density polyethylene only.

EXAMPLES 15-19

A series of low density/linear low density polyethylene foams were prepared using the techniques of Example 7 and the amounts of the low density and linear low density polyethylenes, blowing agent and cross-linking agent as set forth in Table V except that the linear low density polyethylene employed in these Examples has a melt index of 25 g/10 min., a density of 0.92 g/cm$^3$ and a Vicat softening temperature of 93°-97° C.

The cross-linking degree, tensile properties, compression strength and tear resistance of each of the resulting foams were measured and are also set forth in Table V. For comparative purposes, the properties of the foam prepared in Comparative Example B are also set forth in Table V.

TABLE V

| EXAMPLE NO. | 15 | 16 | 17 | 18 | 19 | Comparative Example B |
|---|---|---|---|---|---|---|
| Forming Composition[1] | | | | | | |
| Pre-Mixture | | | | | | |
| LDPE | 30 | 30 | 30 | 30 | 30 | 30 |
| AZO | 22.9 | 22.9 | 22.9 | 22.9 | 22.9 | 16 |
| DCP | 0.8 | 0.8 | 0.8 | 0.8 | 0.8 | 0.73 |
| PE Dry Blend | | | | | | |
| LDPE | 60 | 50 | 40 | 30 | 20 | 70 |
| LLDPE | 10 | 20 | 30 | 40 | 50 | — |
| Foam Property | | | | | | |
| Density, g/cm$^3$ | 28 | 24 | 26 | 26.5 | 29 | 33 |
| Tensile Strength kg/cm$^2$ | 2.7 | 2.35 | 2.2 | 2.15 | 2.9 | 2.6 |
| Elongation, % | 130 | 135 | 141 | 123 | 173 | 90 |
| Tear Strength, kg/cm | 1.8 | 1.72 | 1.57 | 1.78 | 1.92 | 2.0 |
| Compression Strength, kg/cm$^2$ | 0.29 | 0.32 | 0.31 | 0.32 | 0.34 | 0.44 |
| Cross-linking Degree, % | 73 | 70 | 67 | 65 | 61 | 72 |

[1]Same as Footnote[1] in Table I

As evidenced by the data set forth in Table V, the foam properties were dependent on the amounts of low density and linear low density polyethylenes employed. However, in all cases, the foams of LDPE/LLDPE exhibit superior properties as compared to foams prepared from LDPE only. Examples 15-19 were repeated except that the amounts of the azodicarbonamide blowing agent was reduced to 15 parts per 100 parts of the low density/linear low density polyethylenes employed. A series of foams having excellent properties but somewhat higher densities was manufactured.

What is claimed is:

1. A method for preparing a foam of one or more cross-linked olefin polymer(s) and optionally one or more other polymer(s) wherein the olefinic polymer or, if two or more olefinic polymers are employed, at least one of the olefinic polymers is a linear low density polyethylene wherein the method comprises mixing the linear low density polyethylene, blowing agent and other additives, if employed; preparing the mixture as a sheet material; and subsequently cross-linking and foaming the resulting sheet material characterized in that the linear low density polyethylene has a Vicat softening temperature, as measured by ASTM test method designated D-1525-75 of less than 105° C., cross-linking is affected by a chemical cross-linking agent and cross-linking agent is employed in an amount of 0.3 to 1.5 weight percent and the blowing agent is employed in an amount of from 0.1 to 30 weight percent, said weight percents being based on the total weight of the polymeric material employed.

2. The method of claim 1 characterized in that the foam is prepared from a combination of a linear low density polyethylene and low density polyethylene.

3. The method of claim 2 characterized in that at least a portion of the low density polyethylene is pre-mixed with the blowing agent, the cross-linking agent and, if employed, other additives; this pre-mixture is subsequently blended with the linear low density polyethylene and the resulting foaming composition is then foamed.

4. The method of claim 3 characterized in that the pre-mixture, prior to blending with the linear low density polyethylene to form the foaming composition, is extruded at a temperature above the temperature at which the low density polyethylene is softened and the extruded mass is ground into granular form.

5. The method of claim 3 characterized in that only a portion of the low density polyethylene is employed in preparing the pre-mixture and the linear low density polyethylene is dry blended with the remainder of the low density polyethylene for subsequent blending of the dry blend with the premixture to form the foaming composition.

6. The method of claims 3 characterized in that the foaming composition is prepared as a sheet by extruding the mixture of the linear low density polyethylene, low density polyethylene, blowing agent and optionally employed cross-linking agent and other additives.

7. The method of claim 6 characterized in that the sheet is foamed at temperatures between 150° C. and 275° C.

8. The method of claim 7 characterized in that a chemical cross-linking agent is employed and the sheet is subjected to two temperatures, the first temperature being from 150° C. to 250° C. and the second temperature being higher than the first temperature and being from 210° C. to 260° C.

9. The method of claim 8 wherein the blowing agent is azodicarbonamide and a chemical cross-linking agent is employed.

* * * * *

UNITED STATES PATENT AND TRADEMARK OFFICE
CERTIFICATE OF CORRECTION

PATENT NO. : 4,738,810
DATED : April 19, 1988
INVENTOR(S) : John S. Cheng-Shiang It is certified that error appears in the above—identified patent and that said Letters Patent is hereby corrected as shown below:

Column 6, line 5, "polyethylene," should read --polyethylene--.

Column 10, between lines 17 and 19, "EXAMPLE 8-9" should read --EXAMPLES 8-9--.

Column 11, lines 60-65, TABLE V, under EXAMPLE NO. "Forming" should read --Foaming--.

Column 12, TABLE V-continued, between lines 5-10, under Foam Property, "Density, $g/cm^3$" should read --Density, $g/dm^3$--.

Column 13, Claim 6, line 7, "claims" should read --claim--.

Signed and Sealed this

Eighth Day of November, 1988

Attest:

DONALD J. QUIGG

Attesting Officer

Commissioner of Patents and Trademarks